United States Patent
Robichaud

(10) Patent No.: US 8,990,638 B1
(45) Date of Patent: Mar. 24, 2015

(54) SELF-STABILIZING NETWORK NODES IN MOBILE DISCOVERY SYSTEM

(71) Applicant: Digimarc Corporation, Beaverton, OR (US)

(72) Inventor: Brett Robichaud, Hillsboro, OR (US)

(73) Assignee: Digimarc Corporation, Beaverton, OR (US)

( * ) Notice: Subject to any disclaimer, the term of this patent is extended or adjusted under 35 U.S.C. 154(b) by 142 days.

(21) Appl. No.: 13/842,412

(22) Filed: Mar. 15, 2013

(51) Int. Cl.
*G06F 11/00* (2006.01)
*G06F 11/14* (2006.01)

(52) U.S. Cl.
CPC .................... *G06F 11/1412* (2013.01)
USPC .................... 714/47.2; 709/223; 709/224

(58) Field of Classification Search
USPC ............................................... 714/47.2
See application file for complete search history.

(56) References Cited

U.S. PATENT DOCUMENTS

| | | | | |
|---|---|---|---|---|
| 6,590,996 | B1* | 7/2003 | Reed et al. | 382/100 |
| 7,174,293 | B2* | 2/2007 | Kenyon et al. | 704/231 |
| 7,346,512 | B2* | 3/2008 | Li-Chun Wang et al. | 704/270 |
| 7,415,536 | B2* | 8/2008 | Nakazawa | 709/245 |
| 7,426,576 | B1* | 9/2008 | Banga et al. | 709/245 |
| 7,555,649 | B1* | 6/2009 | Schwenk et al. | 713/176 |
| 8,443,105 | B1* | 5/2013 | Finkler et al. | 709/238 |
| 8,620,021 | B2* | 12/2013 | Knudson et al. | 382/100 |
| 8,620,772 | B2* | 12/2013 | Owen | 705/26.9 |
| 8,762,852 | B2* | 6/2014 | Davis et al. | 715/727 |
| 8,819,172 | B2* | 8/2014 | Davis et al. | 709/217 |
| 8,831,279 | B2* | 9/2014 | Rodriguez et al. | 382/103 |
| 8,848,970 | B2* | 9/2014 | Aller et al. | 382/100 |
| 8,867,782 | B2* | 10/2014 | Kurtz et al. | 382/100 |
| 2002/0178410 | A1* | 11/2002 | Haitsma et al. | 714/709 |
| 2004/0143579 | A1* | 7/2004 | Nakazawa | 707/10 |
| 2009/0286572 | A1* | 11/2009 | Rhoads et al. | 455/557 |
| 2010/0161831 | A1* | 6/2010 | Haas et al. | 709/235 |
| 2012/0116559 | A1* | 5/2012 | Davis et al. | 700/94 |
| 2012/0134548 | A1* | 5/2012 | Rhoads et al. | 382/118 |
| 2012/0154633 | A1* | 6/2012 | Rodriguez | 348/231.99 |
| 2012/0208592 | A1* | 8/2012 | Davis et al. | 455/556.1 |
| 2012/0210233 | A1* | 8/2012 | Davis et al. | 715/727 |
| 2012/0224743 | A1* | 9/2012 | Rodriguez et al. | 382/103 |
| 2012/0275642 | A1* | 11/2012 | Aller et al. | 382/100 |
| 2012/0277893 | A1* | 11/2012 | Davis et al. | 700/94 |

(Continued)

*Primary Examiner* — Kamini Patel
(74) *Attorney, Agent, or Firm* — Digimarc Corporation

(57) ABSTRACT

The disclosure relates to cloud-based mobile discovery networks. For example, a mobile discovery network may include a network responsive to successful watermark detection or fingerprint extraction. One claim recites a method of controlling availability of a cloud-based resolver cell in a mobile discovery network, the mobile discovery network comprising a cloud-based traffic router for load balancing requests from remote devices, said method comprising: at the resolver cell, monitoring responses to a plurality of status checks issued by the traffic router to the resolver cell, starting with a first response that includes an error, said monitoring comprising monitoring the next n responses from the resolver cell to the traffic router, where n is an integer more than 3, to determine whether: i) a predetermined percentage of the monitored responses included errors; ii) any response included an error within a preceding time period, and iii) the last response to the traffic router include an error; and if any of items i-iii are true, entering a stabilization mode for a predetermined time, during which predetermined time the resolver cell will issue an unavailable status to the traffic router. Of course other claims and combinations are provided as well.

19 Claims, 3 Drawing Sheets

(56) References Cited

U.S. PATENT DOCUMENTS

| | | | |
|---|---|---|---|
| 2012/0280908 A1* | 11/2012 | Rhoads et al. | 345/156 |
| 2012/0282905 A1* | 11/2012 | Owen | 455/414.1 |
| 2012/0282911 A1* | 11/2012 | Davis et al. | 455/418 |
| 2012/0284012 A1* | 11/2012 | Rodriguez et al. | 704/1 |
| 2012/0284122 A1* | 11/2012 | Brandis | 705/14.64 |
| 2012/0284339 A1* | 11/2012 | Rodriguez | 709/204 |
| 2012/0284593 A1* | 11/2012 | Rodriguez | 715/201 |
| 2012/0311623 A1* | 12/2012 | Davis et al. | 725/18 |
| 2013/0097630 A1* | 4/2013 | Rodriguez | 725/32 |
| 2013/0150117 A1* | 6/2013 | Rodriguez et al. | 455/550.1 |
| 2013/0169838 A1* | 7/2013 | Rodriguez et al. | 348/231.4 |
| 2013/0183952 A1* | 7/2013 | Davis et al. | 455/418 |
| 2013/0260727 A1* | 10/2013 | Knudson et al. | 455/414.1 |
| 2013/0335783 A1* | 12/2013 | Kurtz et al. | 358/3.28 |
| 2013/0335784 A1* | 12/2013 | Kurtz et al. | 358/3.28 |
| 2014/0007193 A1* | 1/2014 | Qureshi et al. | 726/3 |
| 2014/0119593 A1* | 5/2014 | Filler | 382/100 |
| 2014/0222612 A1* | 8/2014 | Knudson et al. | 705/26.7 |
| 2014/0320021 A1* | 10/2014 | Conwell | 315/152 |
| 2014/0324596 A1* | 10/2014 | Rodriguez | 705/14.66 |
| 2014/0324833 A1* | 10/2014 | Davis et al. | 707/722 |

\* cited by examiner

US 8,990,638 B1

SELF-STABILIZING NETWORK NODES IN MOBILE DISCOVERY SYSTEM

APPLICATION FIELD

This application generally relates to U.S. patent application Ser. No. 13/299,140, filed Nov. 11, 2011 (published as US 2012-0208592 A1); Ser. No. 13/572,873, filed Aug. 13, 2012 (published as US 2012-0311623 A1); Ser. No. 13/684,093, filed Nov. 21, 2012; and U.S. Pat. No. 7,174,031. Each of the above patent documents is hereby incorporated herein by reference in its entirety.

TECHNICAL FIELD

This disclosure relates, e.g., to digital signal processing, image, video and audio recognition, cloud computing, network services and data signal detection.

BACKGROUND AND SUMMARY

Cloud computing uses computing resources (e.g., hardware, memory and software) that can be delivered as a service over a network (e.g., the Internet). Cloud computing delegates computation, software and information to remote locations, often over distributed resources.

This disclosure describes, among other things, methods and systems for improving user interaction and response time in object-recognition mobile discovery systems. For example, network nodes responsible for providing response to mobile devices can monitor their own performance, and self-stabilize to ensure overall efficient network performance.

The foregoing and a great number of other features, methods, systems and advantages of the present technology will be more readily apparent from the following detailed description, which proceeds with reference to the accompanying drawings.

DETAILED DESCRIPTION

Figure 1:
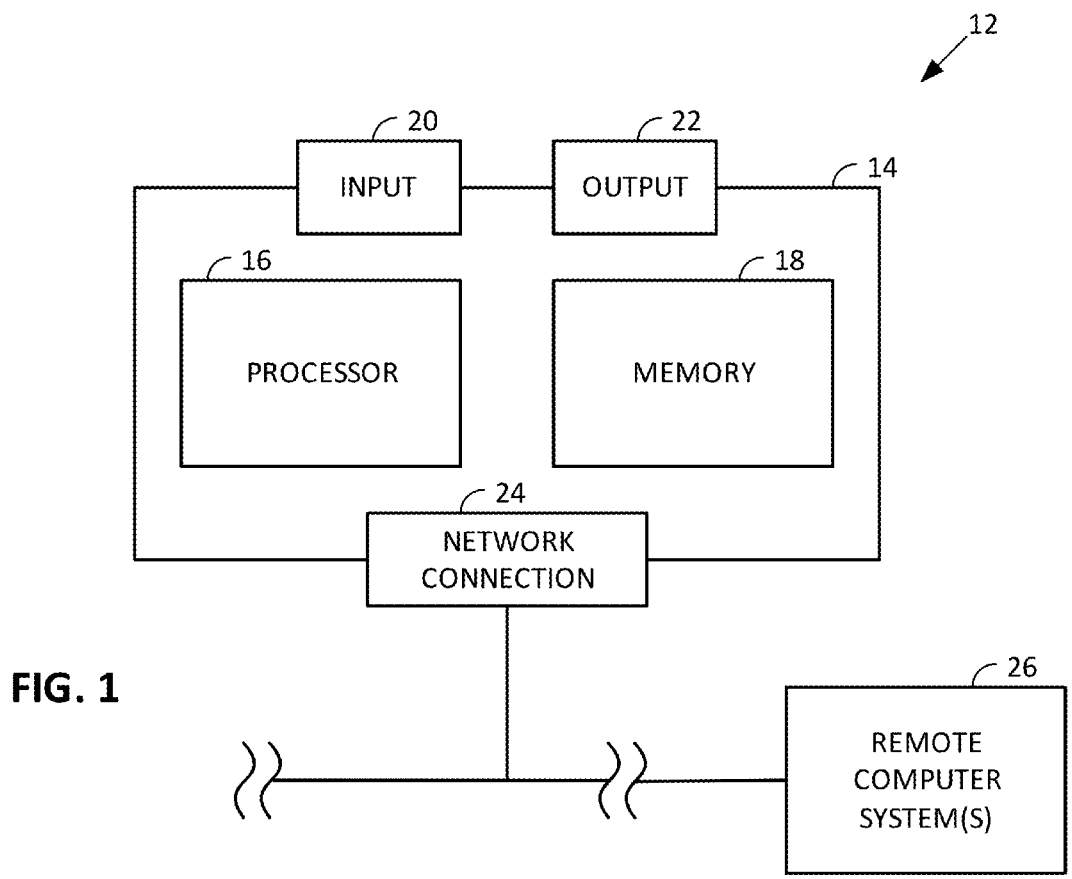
FIG. 1 is a block diagram of a system that can be used in certain embodiments of the present technology.

An emerging class of "mobile discovery" applications uses cameras and microphones on mobile devices for recognition and identification of media and physical objects. Digimarc Discover, provided by Digimarc Corporation in Beaverton, Oreg., USA, is such a mobile discovery application. The Digimarc Discover application is sometimes referred to below as simply "Discover".

The Discover application is able to identify many forms of media and physical objects. Once an object is identified, local and network services support a variety of usage models on the mobile device. Discover currently employs watermarking, fingerprinting, and barcode-reading technologies and has been designed to incorporate other identification technologies such as RFID, OCR, speech recognition, and complex computer vision algorithms for content-based image and video recognition and retrieval.

Discover uses watermarking to identify images in newspapers, magazines, books, flyers, and other printed material. (Discovery can be configured to use watermarking for audio recognition too.) A digital watermark is a code that can be embedded in all forms of digital content, generally imperceptible to people but detectable by digital devices. Similarly, digital watermarks applied to digital content persist with the content through manipulation, copying, etc. Digital watermarks effectively give all forms of media and many objects a digital identity. In prior work, several methods for generating the watermark signal, and for detecting the watermark signal in objects, are detailed. Please see U.S. Pat. Nos. 6,614,914 and 6,590,996, which are incorporated herein by reference in their entireties.

Printed images can be embedded with a digital watermark before or during publishing. The watermark is imperceptible and carries a unique code that Discover detects when the image is viewed with a camera. The code enables retrieval of additional content related to the printed material. Discover enables printed content to be a launching point into related digital content. Users experience a familiar media with the added dimension of interactivity, so content can be enhanced and users can explore items of interest in greater detail. Usage examples include real-time retrieval of information related to an interesting news story. Readers can watch videos of late-breaking news, view sports schedules, purchase tickets, or learn recent scores. They can share interesting articles from the newspaper via email or a social network such as Facebook.

Aural search utilizing a microphone enables a variety of applications, some of which are related to music discovery. With an enabled mobile device, users can identify music in their environments and access network services associated with the music. Discover utilizes fingerprinting technology to recognize music and can identify millions of songs. Using Discover, a person in a coffee shop, car or a shopping mall can identify music to learn about the artist, lyrics, publisher, etc. A user can download associated video, review the concert calendar, rate the song, buy the song or album, and share any of this information with friends via email or social networks.

A digital fingerprint is a unique pattern that identifies content. A fingerprint is derived or extracted from selected inherent properties of the content. For example, the fingerprints of audio and video content could be derived from frequencies, timing, color, or luminosity. As with a human fingerprint, the fingerprint of unidentified content can be compared to a database of known fingerprints to identify the original content. Digital fingerprinting is a form of pattern recognition, a term used in some commercial systems for similar approaches. Examples of audio and/or video recognition are described in U.S. Pat. Nos. 7,174,293, 7,346,512, 6,990,453 and U.S. Patent Publication Nos. 20020178410 and 20100322469, which are hereby incorporated herein by reference in their entireties. For additional examples see, e.g., Oostveen, J., Kalker, T. and Haitsma, J., "Feature extraction and a database strategy for video fingerprinting," Proc. 5th Int. Conf. Recent Advance in Visual Information Systems, pp. 117-128, 2002; and "Video fingerprinting for copy identification: from research to industry applications", Proceedings of SPIE, Media Forensics and Security, Vol. 7254, February 2009, which are hereby incorporated herein by reference in their entireties.

Referring to FIG. 1, an illustrative system 12 includes a device 14 (e.g., a mobile phone) having one or more processors 16 (or processing cores), one or more memory units 18, one or more input peripherals 20, and one or more output peripherals 22. System 12 may also include a network connection 24, and may communicate with one or more remote computers 26, e.g., in a cloud-based computing system.

An illustrative device 14 is a smartphone or a tablet computer, although any other consumer electronic device can be used. The processor 16 can comprise a microprocessor such as an Atom or A4 device, which may include multiple processing cores. The processor's operation is controlled, in part, by information stored in the memory unit 18, such as operating system software, application software (e.g., "apps"), data, etc. The memory may comprise flash memory, a hard drive, etc.

The input peripherals 20 may include one or more cameras and/or one or more microphones. The peripherals (or device 14 itself) may also comprise an interface system by which analog signals sampled by the camera/microphone are converted into digital data suitable for processing by the system. Other input peripherals can include a touch screen, keyboard, etc. The output peripherals 22 can include a display screen, speaker, etc.

The network connection 24 can be wired (e.g., Ethernet, etc.), wireless (WiFi, 4G, LTE, Bluetooth, etc.), or both.

Figure 2:
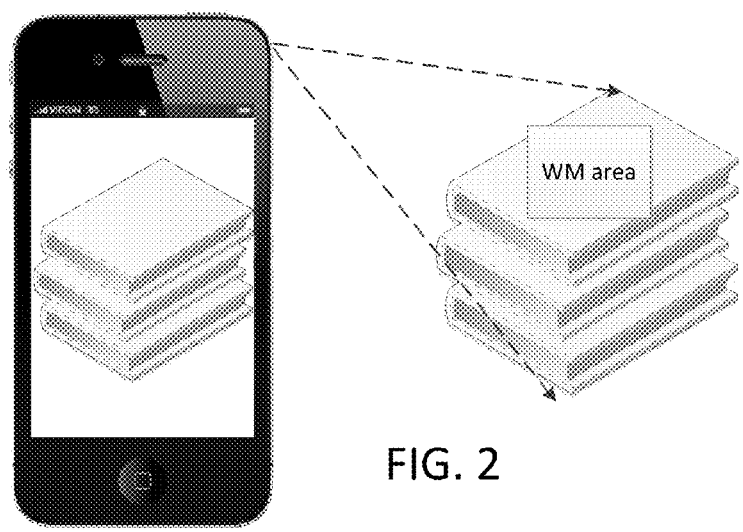
FIG. 2 is a diagram of a cell phone capturing imagery of printed material.

In an exemplary operation, device 14 receives a set of digital content data, such as through a camera or microphone 20, through the network connection 24, or otherwise. The content data may be of any type; audio and video are exemplary. FIG. 2 shows image capture of watermarked printed material by a device 14.

The system 12 processes the digital content data to generate corresponding identification data. This may be done, e.g., by applying a digital watermark decoding process, or a fingerprinting algorithm—desirably to data representing the sonic or visual information itself, rather than to so-called "out-of-band" data (e.g., file names, header data, etc.). The resulting identification data serves to distinguish the received content data from other data of the same type (e.g., other audio or other video).

Figure 3:
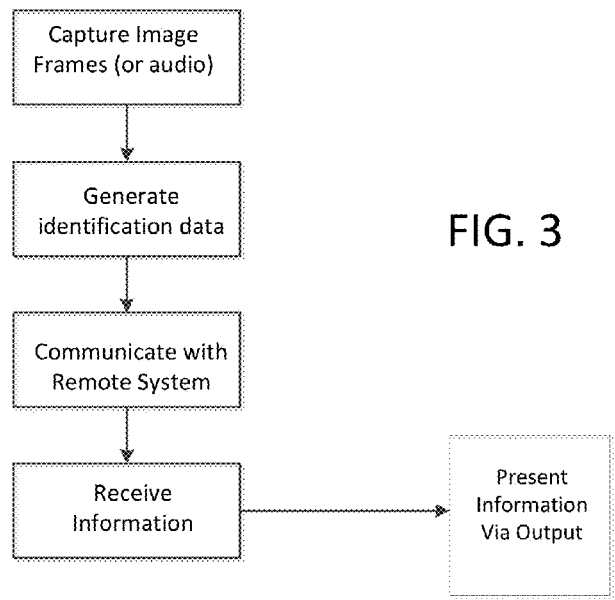
FIG. 3 is a flow diagram of a mobile discovery process.

The identification data can be communicated to a remote system (see FIG. 3). There, information, audio/visual content, links, XML and/or actions can be identified and returned to device 14 through the network connection 24 for presentation via output peripheral 22. In some cases, the digital content data (or a subset of such, a filtered version of such, or a transformed version of such) is communicated to a remote system. The remote system generates the identification data and returns corresponding information, audio/visual content, links, XML and/or actions, etc.

One implementation of such, with particular emphasis on a backend structure hosted in the cloud, is discussed with reference to FIG. 4.

Figure 4:
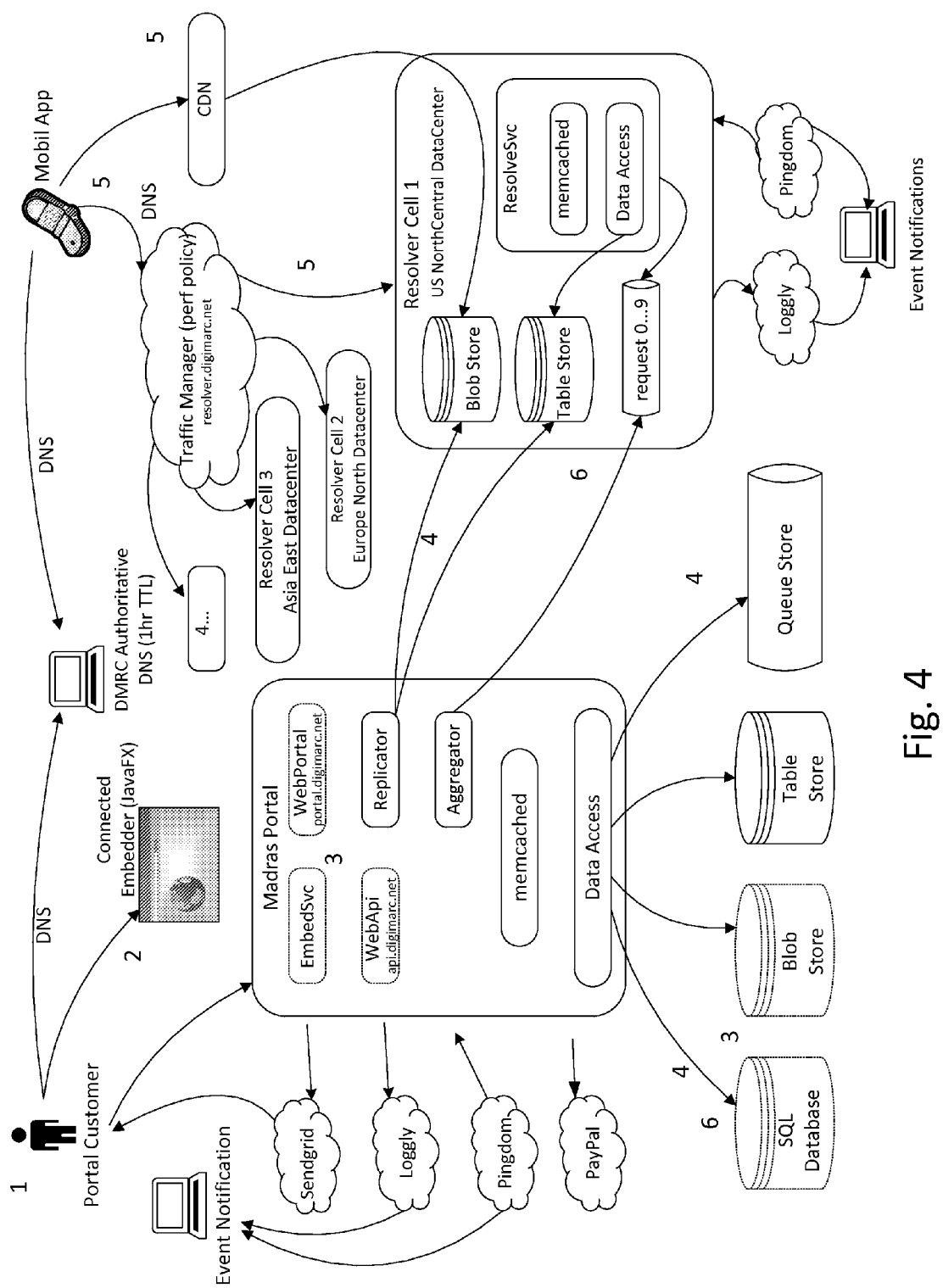
FIG. 4 is a system diagram of an example mobile discovery ecosystem.

FIG. 4 shows a functional block diagram associated with one implementation of the Digimarc Discover ecosystem, and more generally, a mobile discovery system. In this implementation, the backend system is hosted in the cloud, e.g., using Microsoft's Azure platform. Of course, system's hosted on other cloud platforms, e.g., Amazon's cloud, would similarly benefit from our improvements. Cloud computing provide resource, often distributed resources, to implement processing and storage features. The module discussed below (e.g., Replicator, Resolver Cell, Aggregator, Queue Store) are implemented by software running on cloud processors, and may involve cloud provided storage.

Windows Azure is a Microsoft cloud computing platform for building, deploying and managing applications and services through a global network of datacenters. It provides both platform as a service (PaaS) and infrastructure as a service (IaaS) services and supports many different programming languages, tools and frameworks. Windows Azure can be used to build a web application that runs and stores its data in Microsoft datacenters. It can connect on-premises applications with each other or map between different sets of identity information.

In FIG. 4, action 1, a Digimarc Discover customer ("Portal Customer") may access an online registration portal (WebPortal) to begin object (e.g., print, audio, video) registration for use in a mobile discovery system. The object may be intended to be printed in a magazine, newspaper, posted online, etc. Or the object may be video or audio to be watermarked, etc. The online registration portal—shown as hosted in the cloud—may provide an API or other interface through which registration information is provided by the customer (action 3). For example, the customer may enter an object or project name, destination URL (e.g., payoff once a watermark is read), XML file with action information, payment information (e.g., linked with PayPal), etc. The registration process also allows a customer to obtain a watermark embedder for embedding the image. For example, a Java client based watermark embedder ("Connected Embedder") may be accessed and downloaded to the customer's local computer (action 2). The embedder may modify customer images, graphics, video or audio to include digital watermarking. The digital watermark preferably includes a unique identifier that can be used to reference the customer provided information, e.g., a destination URL.

Watermark identifiers, image metadata, payoff information (e.g., XML information to be returned to a user reading a watermark) and other details can be maintained in cloud-based main storage (action 3; SQL Database, Blob Store) during customer registration.

We've developed improvements to ensure that such customer information is efficiently propagated across a mobile discovery ecosystem. One approach uses our Replicator and Queue Store (action 4). These processes can be configured to run on one or more cloud-based servers, with access to cloud-based storage. The Queue Store can be set to indicate (e.g., via a flag or message) that new information is available in main storage to be published to globally distributed Resolver Cells. The so-called "main storage" can take many forms. For example, we prefer to maintain a relational SQL database, and create subsets of such information in a non-relational storage ("Blob Store"). For example, the Blob Store may contain just that information that is intended to be provided to a smartphone in response to a successful watermark read or fingerprint extraction. The Blob Store information can be indexed according, e.g., to watermark type (e.g., what kind of watermark), watermark identifier, fingerprint, or other distinguishing information. The Blob Store may also include organized information (e.g., XLM data) stored according to its index (e.g., watermark identifier).

A Replicator monitors the Queue Store (or the Queue Store can be configured to interrupt the Replicator) to determine whether there is new information and where that information is stored in main storage (e.g., preferable the subsets of such information in the Blob Store). If so, the Replicator can access the information and replicate it to the variously distributed Resolver Cells. The information is stored in storage units, corresponding to the "Blob Store" associated with each Resolver Cell. For example, there might be 4-36 (or more or less) Resolver Cells geographically located around the global. Geographically dispersing such cells reduces overall time-delays for users reading watermarks from watermarked images. In general terms, a resolver cell is a cloud hosted module that is responsible for identifying and providing a response to identified objects in a mobile discovery network.

A resolver cell may also store mobile request information to be accessed for storage in main storage.

The Queue Store is preferable arranged to delete reference to new information within a certain time period. For example, such references will be deleted or expire every 10-90 seconds. In a different configuration, queue references (e.g., messages) are deleted once accessed obtained by the Replicator. Because of these arrangements, the Replicator, upon an unsuccessful Resolver Cell update, preferably updates the Queue Store to again include the reference to new information and an indication of which Resolver Cell(s) needs to be updated with the information. There can be a delay built into this process to allow an unavailable Resolver Cell to stabilize or to allow the Replicator time to continue its operation. The Replicator upon its next interaction with the Queue Store will see the reference and ensure any previous unsuccessful replications are rectified. This is particularly helpful in a configuration running multiple instances of the Replicator. For example, a Replicator 1 may enter a reference into the Queue Store and then move on to process other replications; in the meantime a Replicator 2 or 3 or n (integer) might access the Queue Store and see the reference to the unsuccessful update and attempt to replicate the new information to such.

Now consider the interaction from a user's perspective. A user images a printed (or digital) image with a smartphone running the Digimarc Discover application (see action 5). The smartphone captures imagery or audio and decodes a digital watermark hidden therein (or calculates a fingerprint of such). The Digimarc Discover application communicates with a remote service according to DSN routing information, and issues a request for a response. The decoded watermark information, cellphone information (e.g., cell phone ID), cell phone operating system, etc. can be communicated as part of the request to the remote service. A traffic router (e.g., providing request load balancing and routing), e.g., Traffic Manager as provided in the Azure mobile platform, receives the request and determines which out of a plurality of Resolver Cells to route the response. While we specifically refer to "Traffic Manager" other cloud-based traffic routers and load balancing services could be used instead. Routing determination can be based, e.g., on the closest (geographically) Resolver Cell, or based on fastest response time, or based on availability measures of certain cells, etc. An overview of the Azure's Traffic Manager is provided, e.g., at http://msdn.microsoft.com/en-us/library/windowsazure/hh744833.aspx, the text of which is incorporated herein by reference.

The Resolver Cell uses the request information to determine a response. For example, the Resolver Cell uses the received watermark information (e.g., watermark identifier decoded by the Digimarc Discover app and provided therefrom to the Resolver Cell) to index into its data stores (e.g., Blob Store) to find a corresponding response. In some cases the response is an XML file that contains pointers or links, which once returned to the smartphone, can be processed by the Digimarc Discover app and provided via a device display or speaker.

This all works great until it doesn't.

We've found that cloud data storage and processing components can be a bit finicky. If cloud storage associated with a Resolver Cell is unavailable, yet a smartphone is still routed to such by the traffic router, then the smartphone will not receive a response. So we've made improvements to address this.

In a specific example of a traffic router, Traffic Manager (sometimes referred to herein as TM) will issue a health check to each of the Resolver Cells to determine their operational status. TM can determine the cell status based on whether it receives an available response from a Resolver Cell within a predetermined time period, e.g., 2 availability responses within a 90 second period, or it can determine status after it receives a predetermined consecutive number of non-responses. Our Resolver Cells can issue (or not) a response to the Traffic Manage based on a number of criteria, e.g., its connectivity status, its operational status including access to storage and processing loading, etc.

We noticed, however, that this health check was insufficiently catching storage failures or time lag oscillations. In these case, mobile device initiated requests where being routed to otherwise unstable resolver cells. So we added criteria to ensure that a Resolver Cell is only available to receive smartphone requests when it is operating under stable conditions.

We established a multi-level check of our Resolver Cells to ensure that it was operating in a stable cycle. The cell can look at errors from multiple sources to determine whether to issue an "OK" back to the Traffic Manager. If any of the sources are producing errors, or have produced an error within a predetermined period or sequence, we can choose to take the cell offline until it reaches stable operation.

For example:

1. The availability of all storage resources in the cell can be monitored. A test template (e.g., a test XML file) can be read from storage or multiple different storage area on a regular basis, e.g., every 5 seconds. Success or failures of this check can be used to determine whether a cell is stable. We can also test whether we can successfully write to storage and whether we can successfully set a queue indicating new material, all within a predetermined time period.

2. Traffic Manager Health Checks to the cell can be monitored. For example, upon encounter a first error message in response to the Traffic Manage, the cell monitors all responses during a predetermined time, e.g., the next 180 seconds. A stability decision can be based on the number of positive (or negative) health checks within this time period, and even monitor the last (or last few) health checks responses. For example, if the last response within this time period is an error, the cell can be taken offline until it stabilizes.

3. We monitor any third party inquiries to the cell. For example, a website monitoring service, pingdom, may poll the status of a Resolver Cell, and report such back to the cell operator. The Resolver Cell's response to such can be used to determine the health of a cell, and whether to take the cell offline.

We can use a combination of these checks to determine whether to enter a stabilization mode, e.g. a mode in which the Resolver Cell will only issue unavailable (or failure) status reports back to the Traffic Manager. For example, starting with a first health check error (issued to the Traffic Manager), the cell will track its status for the next n (integer) Traffic Manage health checks, and if any of the following are true the cell will enter into the stabilization mode: i) did ½ (or other predetermined percentage) of the last health checks fail; ii) did any health check fail within the last 30 seconds (or other time period); and iii) did the very last health check fail. If true for any of these, then the Resolver Cell enters a stabilization mode.

In other cases, we combine results from any third party inquiries, traffic manager health checks, and internal (to the Resolver Cell) storage or processing checks within a certain time period or number of checks to determine whether to enter into a stabilization mode.

Once a stabilization mode is entered, the cell is preferably taken offline for a predetermined period, e.g., for 5 minutes the cell reports that it is unavailable to the traffic router, and the health of the cell is monitored and verified before it allows it to return to an online status. During this stabilization mode the cell monitors storage tests (e.g., successful reads of test files, and status writes), looking at third party monitoring responses (e.g., has the cell issued a failure or unavailability to such inquiries), and monitoring results to the Traffic Managers health checks.

The cell will only go back online (e.g., start reporting OK status to the Traffic Manager) if the results of these checks meet predetermined criteria. For example, the cell will only go back online if there are no errors found from any monitored check within the predetermined time period (e.g., 5 minutes). If an error occurred (or when it occurs) the time period will start over. In another approach, the cell will come back online if it only encounters a predetermined amount of errors within the stabilization time period. (E.g., less than 5% during the period and/or+no errors within the last 90 seconds.)

These processes allow individual Resolver Cells to control when to go offline and when to come back online, and not allow its availability to be determined by a cloud routing service, e.g., like Azure's Traffic Manager.

Returning to FIG. 4, a Resolver Cell can populate its Blob Store (or other storage) with information associated with user requests, e.g., which watermarks are read, and from where, and with what device and operating system, and what information was presented, and time delays, etc. A queue (e.g., showing requests 0 . . . 9 in FIG. 4) can be set to indicate that statistics and other information representing a smartphone request has been stored and are ready to be retrieved by the Aggregator. The Aggregator operates much like the Replicator, but in reverse. The Aggregator polls or queries Resolver Cell queues, e.g., every 5-10 seconds, to know when to retrieve such updated information and populate it back to the main storage (see action 6). If the queue is set the Aggregator will access new information from the Resolver Cell and populate back to main storage. This information then can be used to determine and generate statics for particular customer content items, e.g., how many watermark reads, geographic locations of such reads, payoff information, etc.). The Aggregator can update a Resolver Cell's queue to reflect an unsuccessful update to main storage. As with the Replicator, multiple instances of the Aggregator can be used to increase system wide performance.

FIG. 4 also shows a "Table Store" as part of main storage and Resolver Cell storage. Such storage can be used to host test bed information. For example, a customer may want to test system functionality for a watermarked or fingerprinted content item. The can store sample response information in the Table Store and test its functionality before having the content item go live to the public. Other system features in FIG. 4 include: paypal: a customer payment system; Sendgrid: 3rd party SMTP (email) provider to send email; Loggly: 3rd party logging service used to store and query system generated events; Pingdom 3rd party monitoring service use to monitor availability of system services; DRMC Authoritative DNS: manages DNS information for the system; CDN: Windows Azure Content Delivery Network, used to get some of our content (images, XML information, etc.) closer to mobile users for better performance.

While the above discussion has described certain Azure components, e.g., Traffic Manager, the inventive methods and system will function with other cloud-based networks.

Some of the above object-linking examples use image based watermarking which is read by a camera. The inventive methods and systems disclosed herein will also function with other object-based identification, e.g., audio watermarking, barcode linking, fingerprinting, image recognition, etc.

CONCLUDING REMARKS

Having described and illustrated the principles of the technology with reference to specific implementations, it will be recognized that the technology can be implemented in many other, different, forms. To provide a comprehensive disclosure without unduly lengthening the specification, applicants incorporate by reference the patents and patent applications referenced above, in their entireties.

The methods, processes, and systems described above may be implemented in hardware, software or a combination of hardware and software. For example, the processing, replicating and stabilization operations described above may be implemented as instructions stored in a memory and executed by multi-processor based cloud servers on a cloud-based platform, or combination of instructions executed in one or more processors and digital logic circuit modules.

Watermarking, fingerprinting and object recognition methods, instructions, and hardware operate on reference and suspect signal components. Such signals can be represented as a sum of signal components formed by projecting the signal onto basis functions, the above methods generally apply to a variety of signal types. The Fourier transform, for example, represents a signal as a sum of the signal's projections onto a set of basis functions.

This disclosure sometimes uses the term "we" (e.g., "we combine results from any third party inquiries, traffic manager health checks, and internal (to the Resolver Cell) storage or processing checks") to mean that we have developed a process or operations that can be implemented in cloud-based computing services, products and platforms.

The particular combinations of elements and features in the above-detailed embodiments are exemplary only; the interchanging and substitution of these teachings with other teachings in this and the incorporated-by-reference patents/applications are also contemplated.

What is claimed is:

1. A method of controlling availability of a cloud-based resolver cell in a mobile discovery network, the mobile discovery network comprising a cloud-based traffic router for load balancing requests from remote devices, said method comprising:

at the resolver cell, monitoring responses to a plurality of status checks issued by the traffic router to the resolver cell, starting with a first response that includes an error, said monitoring comprising monitoring the next n responses from the resolver cell to the traffic router, where n is an integer more than 3, to determine whether: i) a predetermined percentage of the monitored responses included errors; ii) any response included an error within a set time period during said monitoring, and iii) the last response to the traffic router include an error;

if any of items i-iii are true, entering a stabilization mode for a predetermined time, during which predetermined time the resolver cell will issue an unavailable status to the traffic router.

2. The method of claim 1 in which the set time period comprises a time period biased toward receipt of the nth response.

3. The method of claim 1 in which the stabilization mode is entered only if any of items i-iii are true and responses to any third party inquiries during a time period spanning said monitoring met a predetermined threshold, the predetermined threshold comprising: i) a percentage of errors issued to the third party; or ii) an error issued within the last m number of responses, where m is an integer.

4. The method of claim 3 in which the third party comprise a network monitoring service.

5. The method of claim 1 in which the stabilization mode is entered only if any of items i-iii are true and internal component checks during a time period spanning said monitoring met a predetermined threshold: i) a percentage of failed storage reads or writes; or ii) a failure of a storage read or write within the last x attempts, where x is an integer.

6. The method of claim 5 in which the internal component checks comprise a storage availability check.

7. The method of claim 1 further comprising:
exiting the stabilization mode upon expiration of the predetermined time if the resolver cell meet predetermined operational requirements.

8. The method of claim 7 in which the predetermined operational requirements comprise: i) all responses to the traffic router are error-free during the predetermined time; and ii) all responses to any third party monitoring service is error-free during the predetermined time; and iii) all checks during the predetermined time for performed storage availability checks are error-free.

9. The method of claim 7 in which the predetermined operational requirements comprise: i) a threshold of all responses to the traffic router is error-free during the predetermined time; and ii) a threshold of all responses to any third party monitoring service is error-free during the predetermined time; and iii) a threshold of checks during the predetermined time for performed storage availability checks is error-free.

10. The method of claim 9 in which the threshold in each of i), ii) and iii) each comprise a percentage above 94%.

11. The method of claim 7 further comprising restarting the predetermined time when the predetermined operational requirements are not met.

12. The method of claim 1, when not in the stabilization mode, further comprising providing a response to a mobile device upon receipt of a successful watermark detection or fingerprint extraction, the response being indexed according to watermark information or fingerprint information obtained in the mobile device.

13. A method of replicating information in a cloud-based mobile discovery network, the mobile discovery network comprising a registration portal, a replicator, a message queue, main storage, and a plurality of resolver cells for responding to requests from mobile devices, said method comprising:
upon receipt of new information via the registration portal, queuing a first message in the message queue, the first message indicating the presence of new information, and in which the first message has a predetermined life span within the message queue;
storing the new information in main storage;
with the replicator, communicating with the message queue and accessing the first message and the new information from the main storage;
attempting to replicate the information to storage within the plurality of resolver cells;
upon an unsuccessful replication attempt, queuing a second message in the message queue, the second message indicating which resolver cell the new information was unsuccessfully replicated to.

14. The method of claim 13 in which the message queue comprises the main storage.

15. The method of claim 13 in which the replicator periodically polls the message queue.

16. The method of claim 13 in which the message queue interrupts the replicator.

17. The method of claim 13 in which the second message indicates a location of the new information within main storage.

18. The method of claim 13 in which the first message indicates a location of the new information within the main storage.

19. The method of claim 13 in which the replicator comprises multiple instances.

* * * * *